United States Patent [19]

Mautner

[11] 4,124,948
[45] Nov. 14, 1978

[54] FISHING DEVICE FOR AUTOMATICALLY SETTING A FISH HOOK

[76] Inventor: Edward J. Mautner, 7937 West Dr., Miami Beach, Fla. 33141

[21] Appl. No.: 850,072

[22] Filed: Nov. 10, 1977

[51] Int. Cl.² .......................................... A01K 97/00
[52] U.S. Cl. ................................................. 43/15
[58] Field of Search ..................................... 43/15, 16

[56] References Cited

U.S. PATENT DOCUMENTS

| 422,331 | 2/1890 | Bradford | 43/15 |
| 1,859,944 | 5/1932 | Waitt | 43/15 |
| 2,755,589 | 7/1956 | Osborne | 43/15 |
| 2,799,109 | 7/1957 | Remington | 43/15 |
| 2,876,578 | 3/1959 | Argenio | 43/15 |
| 3,771,250 | 11/1973 | Helmke | 43/15 |

Primary Examiner—Nicholas P. Godici

[57] ABSTRACT

A fishing device for automatically setting a fish hook which is composed of a device for attachment between two lengths of the fishing line and which includes a body and a spring biased member held in a first position and yieldable upon release of a keeper by a tug on the line to rapidly move under the urging of a rubberband to a second position to quickly jab the hook into the roof of the mouth of a fish taking the bait on the other end of the line.

2 Claims, 4 Drawing Figures

FISHING DEVICE FOR AUTOMATICALLY SETTING A FISH HOOK

FIELD OF THE INVENTION

A fishing device for automatically setting the hook in a fish after a fish has taken the bait.

DESCRIPTION OF THE PRIOR ART

The prior art is disclosed generally in several patents known to the inventor including U.S. Pat. Nos. 3,475,847; 3,762,090; 3,834,055; 3,897,646; 3,956,845. These patents show that, generally speaking, it is known to be a problem to quickly set a hook when a fish has taken the bait.

This invention is of an improved device of the general character described.

Generally speaking, this invention includes a body wherein there is a movable member which is releasably held in a first position of extension and yieldable or releasable for a rapid movement to a position to set a hook in a fish's mouth as soon as he tugs sufficiently indicating that he it has taken the bait. It includes a fixed pivot means, a movable pivot means and an elbow type pivot means interconnecting the fixed and movable pivot means and wherein the swingable or elbow pivot means is movable between a first retracted position and a second extended position, all as is described more fully hereinafter.

OBJECTS OF THE INVENTION

It is, generally speaking, an object of this invention to provide an improved device for use in setting the fish hook in the mouth of a fish upon the fish taking the bait.

In accordance with the general objects which will become apparent more fully hereinafter in the light of the specification and the description set forth herein, the instant invention will now be described it being pointed out that none of the prior art devices, while acknowledging the existence of the problem, have provided structure which achieves the advantages and objects of the present invention in accordance with the mode of operation and structure described herein.

DESCRIPTION OF THE PREFERRED EMBODIMENT

Figures 1, 2, 3, 4:
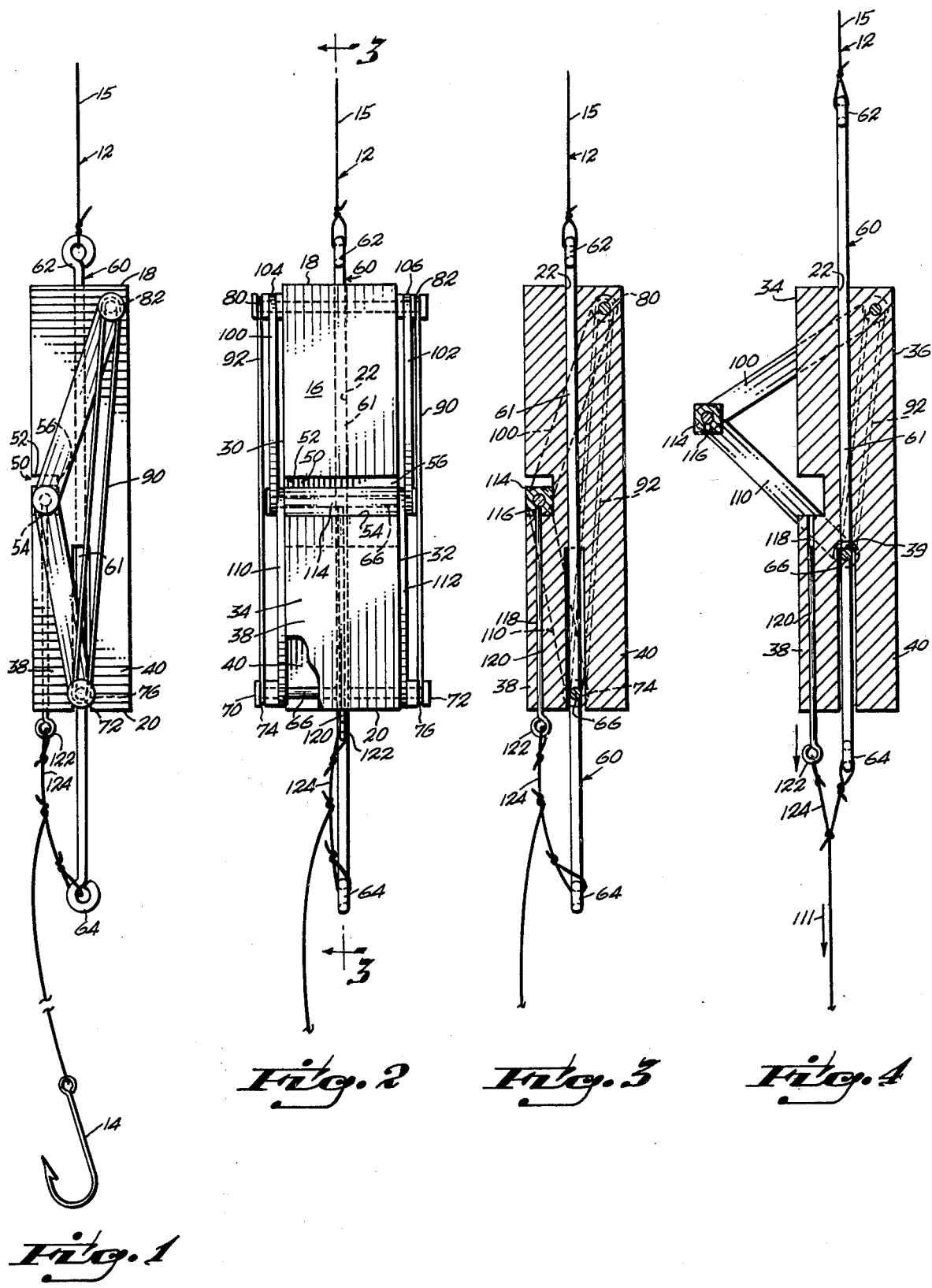
FIG. 1 is a side elevation view of the instant invention.
FIG. 2 is a front elevation view of the instant invention.
FIG. 3 is a view in cross section taken on the plane indicated by the line 3—3 of FIG. 2 and looking in the direction of the arrows and showing the device in a first position when in operation.
FIG. 4 is a view similar to FIG. 3 and illustrating the device when its working parts are in a second position of operation.

Referring to the drawings wherein like reference characters designate like or corresponding parts throughout the several views and referring particularly to FIG. 1, it is seen that a fishing line is provided which is designated by the numeral 12 and that the device is connected in the line between the fish hook 14 and the upper line length 15 which connects to the pole or support. The device of the instant invention comprises a body 16 having a pole end 18 and a fish hook end 20, so named because they face in the direction of the pole end and fish hook respectively. The body is provided with a central axial through hole 22 extending between these ends. In the drawings it is seen that the body is a generally parallelepipedal configuration in the preferred embodiment having a first and second generally parallel side face, 30 and 32, on opposite sides of the through hole and a front and rear face 34 and 36 which are right angularly arranged with respect to the first mentioned pair of faces and, once again, on opposite sides of the hole. The body is bifurcated from the hook facing end by means of a split or an enlargement of the hole, with the slit extending all the way across the body between the side faces 30 and 32 and being centrally arranged between the front and rear faces 34 and 36. The slit or enlargement of the through hole extends from the fish hook end 20 toward the pole facing end 18 a substantial distance, but not quite one-half the distance between the ends 18 and 20. The slit defines a forward leg and a parallel rearward leg on opposite sides which are designated by the numerals 38 and 40.

Across the front face of the body a groove 50 is provided which extends from the first side face to the second side face. It is at a location above the proximal end of the legs, see FIG. 1. The groove defines an upper wall 52, a lower wall 54 and a rear face 56; and this groove is of a predetermined dimension depthwise and of span between its walls.

A cross shaped operator needle 60 is provided which has a stem portion 61 with an upper end 62 and a lower end 64 and a cross arm portion 66. The stem portion 61 of this cross shaped needle is of a length greater than the overall length of the body between the pole end face and the fish hook end face and it is in sliding receipt in the through hole with the cross arm 66 in the slit at all times between the front and rear legs. The cross arm portion extends outwardly of the side faces of the body and the end zones 70 and 72 are provided with an annular seat 74 and 76 in the terminal end zone for a purpose to be described. It should be pointed out that the cross arm in the structure to be defined hereinafter will be slidable between the position shown in FIG. 3, wherein the cross arm is at about the fish hook end of the body and the position shown in FIG. 4 wherein the cross arm is in abutting relation with the body in the crotch 39 between the front and rear legs 38 and 40 and at the juncture of the slit portion with the through hole in the body.

The body is provided with a first and a second outwardly extending and aligned annular shoulder seats each on one of the side faces of the body adjacent the pole end and the rear face of the body. A pair of rubberbands are provided, a first one 90 which connects one of these shoulder annular seats 82 with the seat 76 at one end of the cross arm and a second rubberband 92 the other of which connects the other shoulder annular seat 80 with the other annular seat 74 of the cross arm. This serves to draw the cross arm upwardly maintaining it in a normal position as shown in FIG. 4.

Extending from the outwardly extending portions described above, a first and second upper arm length, 100 and 102 is provided, each upper arm length having an upper pivotal or shoulder end 104 and 106. Pivot connector means on the outwardly extending annular shoulder seat portions in the form of pin and holes in the arm ends are provided for connecting the same. Each of these upper arm lengths is of a length sufficient to extend to the groove when properly aligned. A pair of lower arm lengths 110 and 112 are provided, in addition to the upper arm lengths and each of these lower leg lengths is pivotally connected to the cross arm ends defining pivotal elbow joints at the juncture of the upper and lower arm lengths. The elbow joints are spanned by an elbow member 114 which is sized for receipt in the groove. This member includes a socket 116 which faces toward the fish hook end of the body, that is, towards the fish hook. Within the front leg of the body there is a bore 118 extending in aligned relation from the socket throughout the length thereof from the lower wall of the groove to the fish hook end of the body. A keeper pin 120 of a length sufficient to extend through this bore and into the socket from the end of the body is provided. This keeper pin holds the elbow member 114 in the groove, i.e., in the position shown in FIG. 3, notwithstanding the fact that the rubberbands are utilized and stretched as shown in FIG. 3. The keeper pin includes an eyelet 122 on the outer end and a loose line 124 connects that eyelet 122 to the eyelet on the fish hook end 64 of the stem of the cross shaped needle.

In operation, when the rubberbands are stretched, as shown in FIG. 3, and the elbow joint is in the groove, also as shown in FIG. 3, and held in position by the keeper pin, with a portion extending into the elbow member joint socket, also as shown in FIG. 3, if there is then a tug on the line, as indicated by the arrow 111, the force will pull the keeper pin downwardly slightly which in turn will release the elbow so that, under the influence of the energy stored in the stretched rubberbands, it will move rapidly to the position shown in FIG. 4, which will pull the hook quickly upwardly as the elbow rotates under the influence of the rubberband into the position shown in FIG. 4, firmly hooking a fish.

What is claimed is:

1. For attachment in a fishing line between the hook and the pole connections, a fish hook setting device comprising:
    a body having a pole end and a fish hook end, said body having a central axial hole extending between said ends, and said body having a first and a second side face on opposite sides of said hole and a front and rear face right angularly arranged with respect to said side faces and on opposite sides of said through hole,
    said body having centrally bifurcated defining a front leg and a rear leg, each extending in a common direction toward the hook end, said legs being defined by a slit extending from the first side face to the second side face and said slit being centrally arranged between the front and rear side faces, said slit extending from said fish hook end toward said pole end and terminating at said hole and being parallel to said hole,
    said front face having a groove extending from the first side face to the second side face and being arranged between the pole end and the juncture of the slit and said through hole,
    said groove defining an upper wall, a lower wall, and a rear face zone, and said groove being of a predetermined dimension depthwise and widthwise between the walls,
    a cross shaped needle, said needle having a main stem length greater than the overall length of said body between the pole end and the hook end and in sliding receipt in said hole,
    said needle having a cross arm portion slidably received within the slit and movable between a position
        (a) with the cross arm in the crotch between the legs in abutting engagement with the body, and
        (b) between the legs and adjacent the hook end,
    said needle having a first end extending at all times from said pole end of said body and a second end extending at all times below said bifurcated legs of said body, and said first end having a eyelet means of a cross sectional dimension greater than that of said through hole, comprising stop means to limit movement of said first end into said through hole,
    first fixed pivot means on the body adjacent the pole end;
    second swingable pivot means in the groove of the front face;
    said cross arm comprising third pivot means for linear movement of translation only between the legs and between said positions;
    link means connecting the first and second pivot means, and
    link means connecting the second and third pivot means, and
    said second pivot means being normally in said groove, and
    keeper means to maintain said second pivot means in said groove, and
    elastic means normally urging said second pivot means toward said first pivot means; and
    means to remove the keeper means to release said second pivot means for swinging movement of said second pivot means.

2. A fishing device for setting a hook in a fish after the fish has taken the bait, the device comprising:
    (a) a fixed pivot means,
    (b) means to hold said fixed pivot means,
    (c) a movable pivot means,
    (d) guide means on said means to hold and in sliding engagement with said movable pivot means for guiding movement of said movable pivot means toward and away from said fixed pivot means,
    (e) a swingable pivot means comprising an axis swingable in an elbow action about said fixed pivot means when said movable pivot means moves away from and toward said fixed pivot means,
    (f) first link means having one end pivotally connected to said fixed pivot means and a second end pivotally connected to said swingable pivot means,
    (g) second link means having one end connected to said swingable pivot means and a second end pivotally connected to said movable pivot means,
    (h) releasable keeper means normally interconnecting said means to hold and said swingable pivot means to hold said swingable pivot means in a predetermined position with respect to said means to hold when said movable pivot means is in a first position of extension from said fixed pivot means,
    (i) resilient means normally urging said movable pivot means toward said fixed pivot means when in said first position of extension,
    (j) a slide member captivated on said means to hold and slidably movable on said means to hold between said first position and a second position,
    (k) said guide means including stop means to limit movement of said movable pivot means toward said fixed pivot means and said second position comprising said movable pivot means in engagement with said stop means, (l) said slide member including a first portion extending radially away from said movable pivot means and a second portion extending radially oppositely of said first portion and away from said movable pivot means, (m) release means to release the keeper means for movement of said slide member from said position of extension under the influence of said resilient means toward said second position, whereby when the keeper means is released, the slide member moves rapidly between said first position and said second position under the influence of said resilient means.

* * * * *